United States Patent
Lowe

[15] 3,669,400
[45] June 13, 1972

[54] VEHICLE SEATS
[72] Inventor: Charles B. Lowe, Northampton, England
[73] Assignee: Universal Oil Products Company, Des Plaines, Ill.
[22] Filed: July 24, 1970
[21] Appl. No.: 57,970

[52] U.S. Cl. ..................................248/400, 267/122
[51] Int. Cl. ........................................F16m 13/00
[58] Field of Search .................267/118, 120, 122, 126; 248/400

[56] References Cited
UNITED STATES PATENTS

| | | |
|---|---|---|
| 2,879,829 | 3/1959 | Lavoie et al. ............267/120 |
| 2,760,552 | 8/1956 | Decker ....................248/400 |
| 3,374,981 | 3/1968 | Stuckenberger et al. ....248/400 |
| 2,862,475 | 12/1958 | Kinsman ................277/177 X |

Primary Examiner—William H. Schultz
Attorney—James R. Hoatson, Jr. and Philip T. Liggett

[57] ABSTRACT

A vehicle seat having a seat part and a base part with a gas spring interposed therebetween. A source of compressed gas forms part of the vehicle seat and is fixed to the base part and connected to the gas spring. The seat frequently entails a pump to form the source of compressed gas. The pump preferably has a unique piston arrangement whereby an O-ring seals a piston to a cylinder in the pump during the compression stroke and allows gas passage past the piston during the recovery stroke.

11 Claims, 7 Drawing Figures

PATENTED JUN 13 1972 3,669,400

INVENTOR
Charles B. Lowe

BY: *Jamie R. Hoatson Jr.*
*Philip T. Liggett*
ATTORNEYS

INVENTOR:
Charles B. Lowe

VEHICLE SEATS

This invention relates to seats for vehicles, in particular for tractors, and more particularly to a vehicle seat in which a seat part is mounted for upward and downward movement relative to a base part, a gas spring being interposed between the seat part and the base part to oppose resiliently the downward movement. Usually, the gas spring takes the form of an air spring.

In a vehicle seat incorporating a gas spring, the static position to which the seat part is depressed by the weight of the seat occupant will depend both on the occupant's weight and the mass of gas within the gas spring. Since, however, it is desirable that the static loaded position of the seat should be approximately equidistant from the up and down stop positions of the seat (this being referred to hereinafter as the "ride" position), it is important that the mass of gas within the gas spring should be variable to match the weight of the seat occupant and that this variation should be effected in a simple and efficient manner.

According to one aspect of the present invention, there is provided a vehicle seat comprising a seat part mounted on a spring suspension for upward and downward movement relative to a base part, the spring suspension comprising a gas spring, a source of compressed gas forming part of the seat and fixed to said base part, said source being permanently connected to the said spring and operable to introduce gas into said spring in order to raise the level of the seat part to the ride position and a valve operable to release gas from said spring in order to lower the level of the seat part to the ride position.

According to another aspect, the present invention provides a vehicle seat comprising a seat part mounted on a spring suspension for upward and downward movement relative to a base part, the base part comprising a column extending upwardly at the rear of the seat part from a base plate fixable to the floor of the vehicle, and the suspension comprising a carriage mounted in guides for movement up and down the column, the seat part having a connection to the carriage, a suspension arm pivoted at one end to the base part and at its opposite end to the seat part, a spring opposing the downward movement of the carriage, and a shock absorber connected between the carriage and the base part, said spring being in the form of a gas spring comprising a first gas chamber mounted on the base part and in communication with a second gas chamber mounted on the carriage, one of the chambers being of constant volume and the other being flexible to permit expansion and contraction of the space within the flexible chamber in response to upward and downward movement of the seat part, the gas spring having an inlet valve for introducing compressed gas into the chambers and an outlet valve for releasing compressed gas from the chambers to vary the heights of the seat part.

One construction of vehicle seat according to the invention and incorporating an air spring is shown in the accompanying drawings in which.

Figure 1:
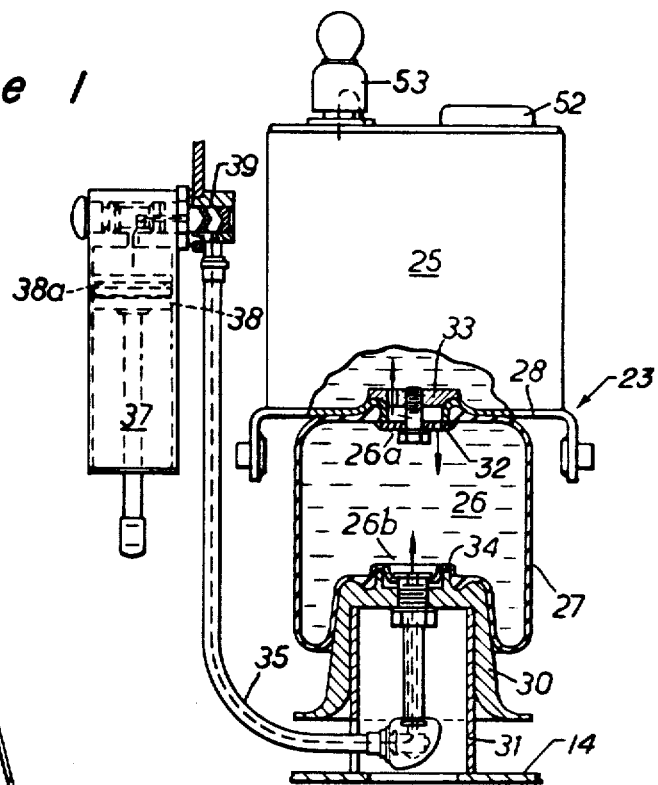
FIG. 1 is a diagrammatic view of the base part and the air spring with its operating pump and control mechanism.

The seat part 10 of the vehicle seat comprises a substantially L-shaped sheet-metal pan 11 for supporting a seat squab and back squab, the seat pan being mounted on a spring suspension for upward and downward movement relative to a base part 12. The base part comprises a column 13 extending upwardly at the rear of the seat part from a base plate 14 designed to be fixed to the floor of a vehicle. The column 13 is of generally rectangular section having a relatively wide opening 15 extending upwardly throughout the forward facing side of the column.

The suspension comprises a carriage 16 disposed partially within the column 13 and having rollers 17 which roll in guides 18 on opposite sides of the column 13, the seat part 10 having a rearward extending U-section hook member 20 which hooks over outwardly projecting lugs 21 on the carriage. The suspension further comprises a U-shaped suspension arm 22 which is pivoted at one end to the underside of the seat part 10 and at its opposite end to the base part 14. A gas spring 23 is connected between the carriage 16 and the base part 14 and a shock absorber 24 is also connected between the carriage and the base part.

The air spring 23 comprises a first chamber 25 having a constant volume defined within the carriage, and a flexible chamber 26 whose peripheral wall is formed by a bellows 27 which is fixed on the one hand to the underside of the lower wall 28 of the carriage and on the other hand to a hub 30. This hub is supported above the base part of the seat by an upright cylindrical spigot 31, the interior of the bellows 27 communicating with the interior of the constant volume chamber 25. The flexible chamber 26 defined by the bellows 27, which conveniently is of a rolling-lobe type, has a relative narrow outlet 26a clamped to the inlet of the constant volume chamber by a pair of opposite apertured clamping plates 32 and 33, the apertures of which can be dimensioned to control the speed of air flow from one chamber to the other. The inlet 26b of the flexible chamber is secured by a clamp 34 to the outlet end of a pipe 35 which extends from a pump 36 or other source of gas under pressure.

The pump 36 is a hand-operable air pump, comprising a cylinder 37 containing a piston 38, and having an outlet fitted with a check valve 39. The cylinder is connected by a pivot 40 at one end to a support 41 on the column 13 for rotation about a first horizontal axis perpendicular to the axis of the cylinder 37 and remote from the piston 38 and the piston rod 42 secured thereto. A linkage arm 43 is connected by a pivot 44 at one end to the column 13 on a second horizontal axis spaced from that of the cylinder. The opposite end of the linkage arm is connected by a pivot 45 on a third horizontal axis to the outer end of the piston rod 42. The arrangement is such that movement of the linkage arm 43 about its pivotal axis in the column causes the piston to move. The pumping or compression strokes occur as the linkage arm moves towards the dead-center position in which the third pivot axis is coplanar with the first and second pivot axes, while the exhaust or recovery stroke occurs as the third axis moves away from the plane of the first and second axes. In the illustrated embodiment, the movement of the linkage arm is effected by a handle 46 secured thereto adjacent the second axis.

Figure 6:
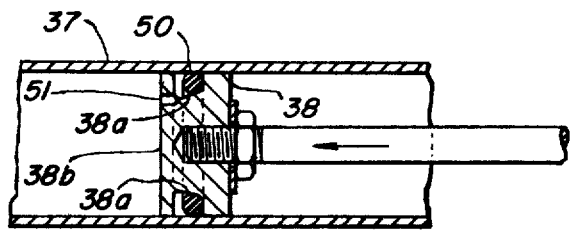
FIG. 6 is an enlarged fragmentary sectional view of the piston and cylinder of the pump of FIG. 3 during the compression stroke.

The piston 38 of the pump is formed with an annular recess or groove 38a in its outer wall for the reception of a seal, the base wall of the recess being tapered such that the depth of the recess 38a increases in a direction towards the forward face 38b of the piston. A circular-section O-ring seal 50 is located in the recess and so dimensioned in relation to the recess that as the piston moves forwards during the compression stroke as in FIG. 6, the seal 50 rolls relative to the piston 38 in a rearward direction and is compressed between the inner wall of the cylinder 37 and the base and rear walls of the groove 38a. On the other hand, as the piston is withdrawn during the recovery stroke, the ring seal rolls forwards relative to the piston into the deeper part of the groove, i.e., on to a portion of the piston of reduced diameter, thus relaxing the ring seal 50 and reducing friction between it and the cylinder wall. An air-leak passage 51 is formed through the piston 38 from the forward face 38b of the piston to the groove 38a to avoid the formation of a substantial pressure difference across the seal during the recovery stroke of the piston which would increase friction between the seal and the cylinder wall during the recovery stroke.

Figure 3:
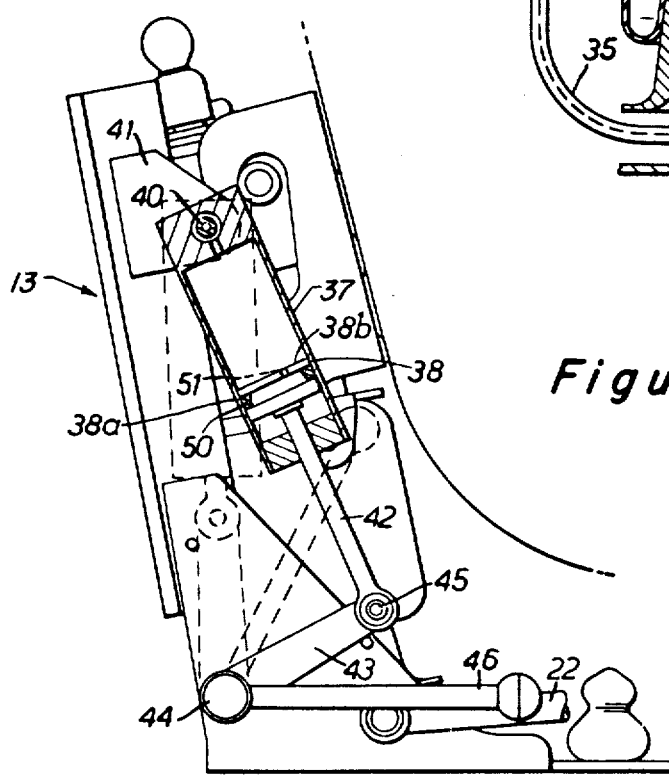
FIG. 3 is a side elevation, on the side opposite to that of FIG. 2, showing a hand-operable pump in section.
Figure 2:
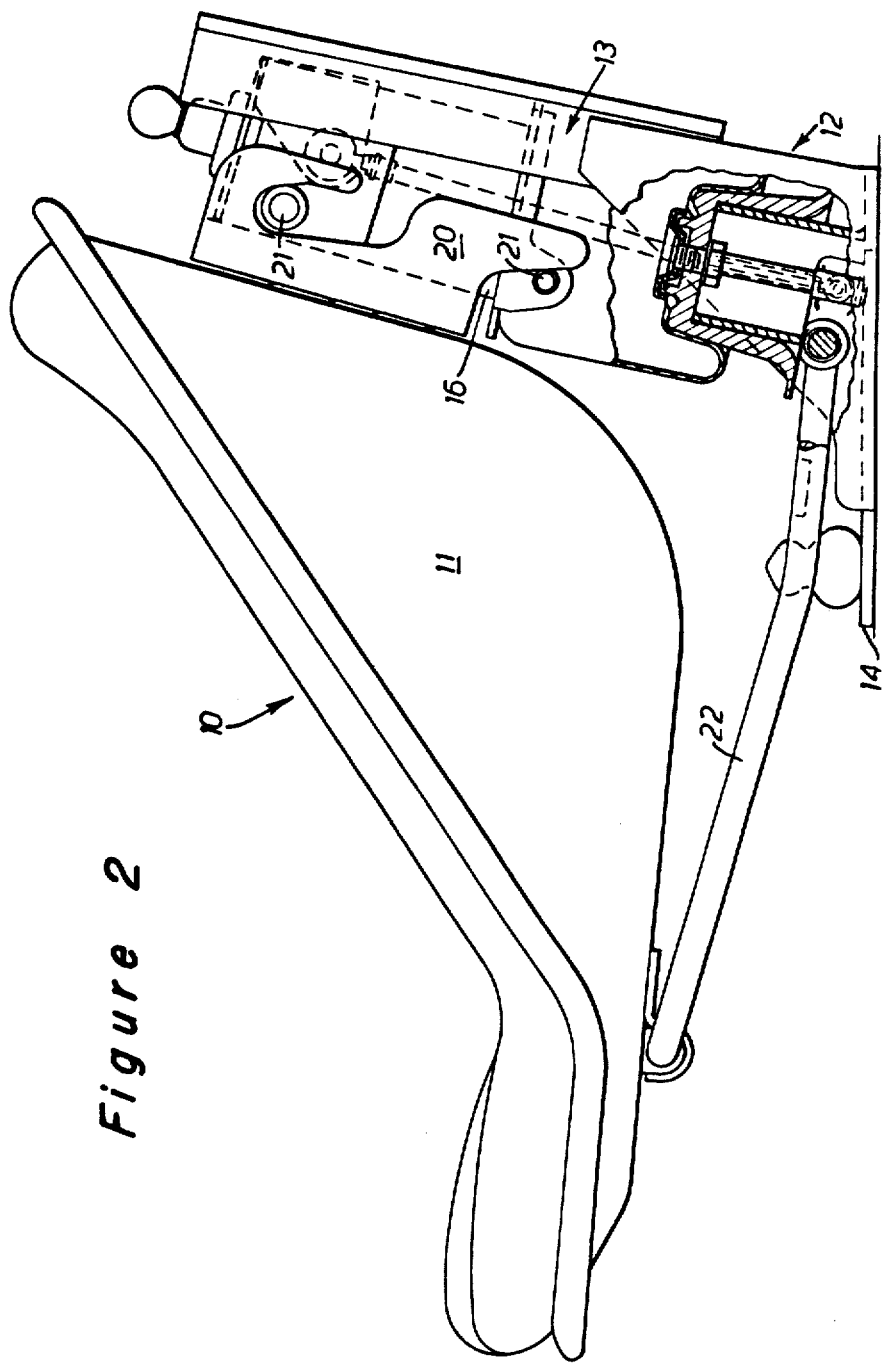
FIG. 2 is a side elevation of a seat, part in section, showing the air spring connected between the base part and seat part.
Figure 4:
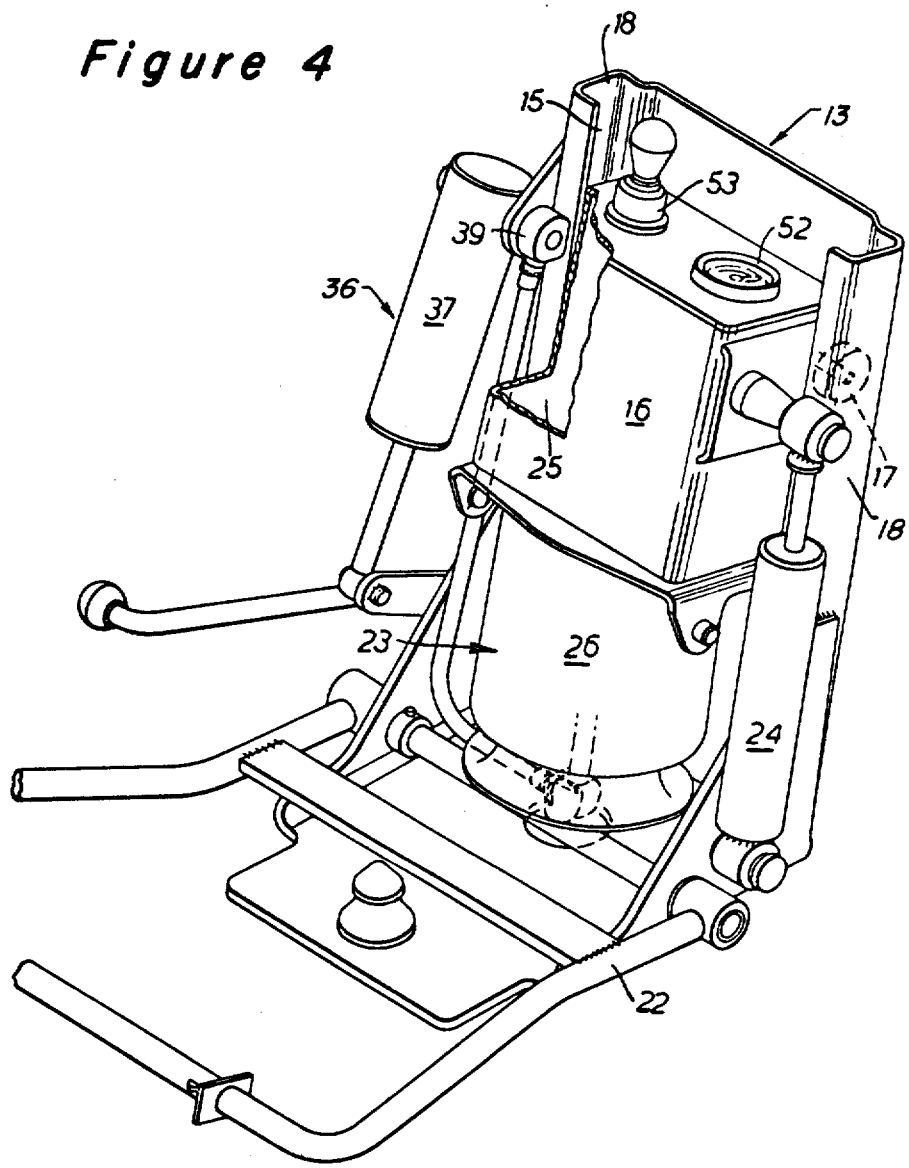
FIG. 4 is a perspective view of the seat after removal of the seat pan.
Figure 5:
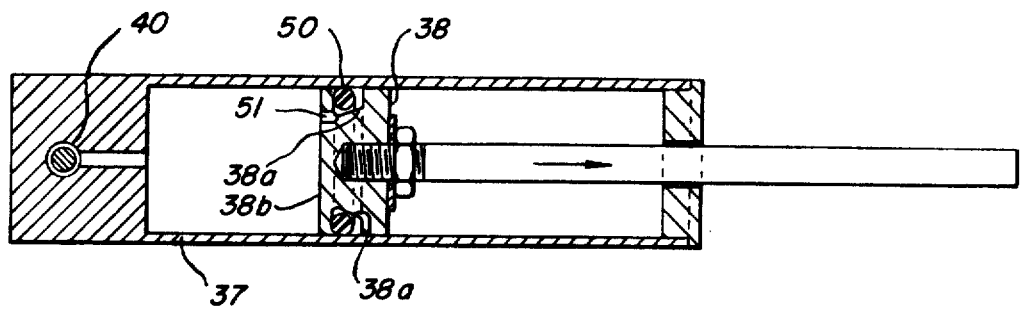
FIG. 5 is an enlarged sectional view of the piston and cylinder of the pump of FIG. 3 during the recovery stroke.

When the pump is of a manually operable type, as illustrated in FIG. 3, the air spring is fitted with an air pressure gauge 52 calibrated to indicate the air pressure within the air spring in terms of the load on the seat, and with a combined air pressure relief valve 53 which also serves as an unload control. This valve is manually operable to release air and so lower the seat height. At a predetermined air pressure in the spring it will open automatically to prevent overloading the air spring or pump.

Figure 7:
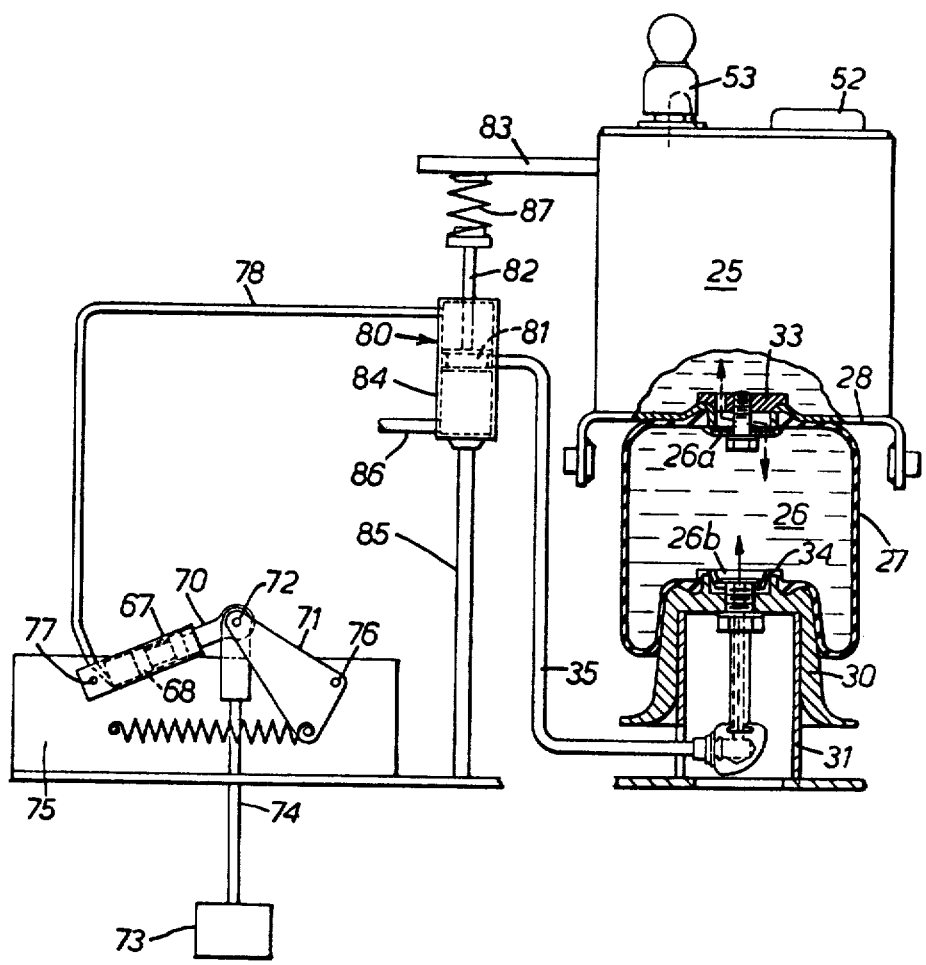
FIG. 7 is a diagrammatic view of a modified embodiment incorporating an inertia pump.

In an alternative embodiment, shown in FIG. 7, the pump is an inertia pump means and comprises a cylinder 67 having a piston 68 mounted on a piston rod 70, the outer end of the rod 70 being connected to a linkage arm 71 through a pivot 72. An inertia weight 73 is suspended from the pivot 72 by an inertia arm 74. The assembly is contained between a parallel spaced pair of vertical plates 75, the cylinder and the outer end of the linkage arm being pivoted between the plates on horizontal axes at 77 and 76 respectively which lie in a common horizontal plane.

The pump has an outlet pipe 78 which is connected to the inlet pipe 35 of the air spring via a leveling valve 80. This valve is of the spool type in which the spool 81 is connected via a stem 82 to a bracket 83 on the seat part and the barrel 84 is connected via a stem 85 to the base part. The interior of the valve is connected to the pump and to the air spring via pipes 78 and 35, and the barrel 84 has a vent 86 to atmosphere. When the spool is at a level corresponding to the ride position of the seat, it seals off the inlet pipe 35 of the air spring from both the pump and the vent 86. When the seat part is raised above the ride position, the interior of the barrel connects the interior of the valve 80 to the pump and to the air spring via pipes 78 and 35, and the barrel has a vent 86 to atmosphere. When the spool is at a level corresponding to the ride position of the seat, it seals off the inlet pipe 35 of the air spring from both the pump and the vent to atmosphere. When the seat part is raised above the ride position, the interior of the barrel connects the inlet pipe 35 with the vent 86 and allows excess air from the air spring to exhaust to atmosphere. Conversely, when the seat part is depressed below the ride position, the interior of the barrel connects the inlet pipe 35 with the outlet pipe 78 from the pump and allows the pump to force air into the spring until the seat part regains the ride position.

A delay mechanism 87, for example a spring, is fitted between the leveling valve and the seat or base part to reduce the response of the valve to transient movement of the seat part relative to the base part when the vehicle is moving over rough terrain.

What we claim is:

1. A vehicle seat comprising a base part, a seat part mounted on a spring suspension for upward and downward movement relative to said base part, said spring suspension comprising a gas spring, a pump source of compressed gas forming part of the seat and fixed to said base part, said pump being permanently connected to the said gas spring and operable to introduce gas into said spring in order to raise the level of said seat part to a ride position, and a valve connected to said gas spring operable to release gas from said spring in order to lower the level of the seat part to the ride position, said pump source comprising a cylinder mounted for pivotal movement about an axis perpendicular to the axis of the cylinder, a piston positioned in said cylinder, a piston rod having an outer end extending from said piston, a linkage arm having opposite ends pivoted at one end to the outer end of the piston rod at a pivot connection and at its opposite end about a support on the base part, and means for moving said linkage arm about said support thereby to move the piston relative to the cylinder.

2. A vehicle seat according to claim 1 wherein the means for moving the linkage arm of the pump comprises a handle movable angularly about said support and rigidly connected to said linkage arm.

3. A vehicle seat according to claim 1 wherein the pivot connection between the piston rod and linkage arm is movable along a linear path through a position in which said rod and arm are colinear.

4. A vehicle seat according to claim 3 wherein said linear path is generally vertical and the means for moving the linkage arm of the pump comprises a mass free to move vertically in response to upward and downward movement of the vehicle and connected to the pump in the vicinity of the pivot connection.

5. A vehicle seat comprising a base part, a seat part mounted on a spring suspension for upward and downward movement relative to said base part, said base part comprising a base plate fixable to the floor of the vehicle, a column extending upwardly at the rear of said seat part from said base plate, and said spring suspension comprising guides attached to said column, a carriage connected to the seat part and mounted in said guides for movement up and down the column, a suspension arm having opposite ends pivoted at one end to the base part and at its opposite end to the seat part, a spring opposing the downward movement of the carriage, and a shock absorber connected between the carriage and the base part, said spring being in the form of a gas spring comprising first and second gas chambers, said first gas chamber being mounted on said base part and in communication with said second gas chamber mounted on said carriage, one of said first and second chambers having a constant volume and the other of said first and second chambers being flexible to permit expansion and contraction of the space within the flexible chamber in response to upward and downward movement of the seat part, the gas spring having an inlet valve for introducing compressed gas into the chambers and an outlet valve for releasing compressed gas from the chambers to raise or lower, respectively, the seat part.

6. A vehicle seat according to claim 5 further comprising pump means mounted on the base part and having a gas-flow connection to said inlet valve.

7. A vehicle seat according to claim 5 wherein the flexible chamber comprises a bellows connected at one end to an inlet of the constant volume chamber and at its opposite end to a mounting hub fixed on the base part.

8. A vehicle seat according to claim 7 wherein the bellows is of a rolling-lobe type.

9. A vehicle seat according to claim 5 wherein the column is of generally rectangular section but having an elongate opening extending upwardly along one side, and the carriage supports rollers which roll in said guides.

10. A vehicle seat according to claim 5 wherein said inlet valve is connected to an inertia pump means operable in response to upward and downward movement of the base part of the seat.

11. A vehicle seat according to claim 10 including a leveling valve means operable to connect the spring to atmosphere when the seat part remains above the ride position, and to connect the spring to the pump when the seat part remains below the ride position.

* * * * *